(12) United States Patent
Nam et al.

(10) Patent No.: US 10,891,411 B2
(45) Date of Patent: Jan. 12, 2021

(54) HIERARCHY-DRIVEN LOGICAL AND PHYSICAL SYNTHESIS CO-OPTIMIZATION

(71) Applicant: INTERNATIONAL BUSINESS MACHINES CORPORATION, Armonk, NY (US)

(72) Inventors: Gi-Joon Nam, Chappaqua, NY (US); David John Geiger, Poughkeepsie, NY (US); Paul G. Villarrubia, Austin, TX (US); Shyam Ramji, LaGrange, NY (US); Myung-Chul Kim, Travis, TX (US); Benjamin Neil Trombley, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/205,197

(22) Filed: Nov. 29, 2018

(65) Prior Publication Data

US 2020/0175122 A1 Jun. 4, 2020

(51) Int. Cl.
*G06F 30/327* (2020.01)
*G06F 30/392* (2020.01)
*G06F 111/20* (2020.01)

(52) U.S. Cl.
CPC .......... *G06F 30/327* (2020.01); *G06F 30/392* (2020.01); *G06F 2111/20* (2020.01)

(58) Field of Classification Search
CPC .... G06F 17/50; G06F 2111/20; G06F 30/327; G06F 30/392
See application file for complete search history.

(56) References Cited

U.S. PATENT DOCUMENTS

| 5,218,551 A | 6/1993 | Agrawal et al. |
| 6,557,145 B2 | 4/2003 | Boyle et al. |

(Continued)

FOREIGN PATENT DOCUMENTS

JP 2002342396 A1 11/2002

OTHER PUBLICATIONS

Anonymous, "Extracting and Employing Path Based, Multi-Stage Useful Skew in Logical Synthesis for High Speed Timing Critical Designs", IP.com Prior Art Database Technical Disclosure IPCOM000215797D, Mar. 12, 2012, 6 pages, http://ip.com/IPCOM/000215797.

(Continued)

*Primary Examiner* — Vuthe Siek
(74) *Attorney, Agent, or Firm* — Erik Johnson; Otterstedt, Wallace & Kammer, LLP

(57) ABSTRACT

A method includes receiving a source file specifying circuit components and electrical connections therebetween. At least a portion of the circuit components and electrical connections are within one or more of a set of logical hierarchical groupings, and a given one of the groupings has one or more electrical connections to at least another one of the groupings. The method also includes selecting an initial subset of the groupings based on one or more characteristics of respective ones of the set of groupings and performing individual logical optimization of respective ones of the initial subset. The method further includes determining a revised subset based on the one or more characteristics of the respective ones of the set of groupings as modified by the logical optimization, and performing global physical optimization of the circuit components and electrical connections based at least in part on the revised subset.

20 Claims, 9 Drawing Sheets

(56) References Cited

U.S. PATENT DOCUMENTS

| | | | |
|---|---|---|---|
| 6,637,009 | B2 | 10/2003 | Narita |
| 7,278,122 | B2 | 10/2007 | Willis |
| 7,318,211 | B2 | 1/2008 | Cadieux |
| 7,761,832 | B2 | 7/2010 | Alpert et al. |
| 7,926,020 | B1 | 4/2011 | Lu et al. |
| 7,937,677 | B2 | 5/2011 | Chien et al. |
| 8,271,920 | B2 | 9/2012 | Cho et al. |
| 8,516,412 | B2 | 8/2013 | Cho et al. |
| 8,826,215 | B1 | 9/2014 | Alpert et al. |
| 9,026,978 | B1 | 5/2015 | Liu et al. |
| 9,495,501 | B1 | 11/2016 | Kim et al. |
| 10,133,842 | B1* | 11/2018 | Kulshreshtha ........ G06F 30/398 |
| 2004/0133860 | A1* | 7/2004 | Hieter ................... G06F 30/327 716/105 |
| 2010/0107130 | A1 | 4/2010 | Bowers et al. |
| 2012/0151431 | A1* | 6/2012 | Huijbregts ............ G06F 30/392 716/131 |

OTHER PUBLICATIONS

Anonymous, "Succinct and Maintainable Representation of Combinational Logic", IP.com Prior Art Database Technical Disclosure IPCOM000248463D, Dec. 1, 2016, 5 pages, http://ip.com/IPCOM/000248463.

Anonymous, "Context Aware Pin Inboarding Techniques for faster and better timing convergence in Large Block Synthesis Process", IP.com Prior Art Database Technical Disclosure IPCOM000220157D, Jul. 24, 2012, 7 pages, http://ip.com/IPCOM/000220157.

Y.-L. Chuang et al., "Design-hierarchy aware mixed-size placement for routability optimization", 2010 IEEE/ACM International Conference on Computer-Aided Design (ICCAD), Nov. 2010, pp. 663-668 https://dl.acm.org/citation.cfm?id=2133570.

X. Yang et al. "Timing-Driven Placement using Design Hierarchy Guided Constraint Generation", 2002 IEEE/ACM International Conference on Computer-Aided Design (ICCAD), Nov. 2002, pp. 177-180 6 pages https://ieeexplore.ieee.org/document/1167531/ https://dl.acm.org/citation.cfm?id=774598.

S. Ray et al., "Synthesis-Guided Partial Hierarchy Collapsing", International Workshop on Logic & Synthesis (IWLS), 2010, 5 pages https://people.eecs.berkeley.edu/~alanmi/publications/2010/iwls10_hie.pdf.

H. Eikerling & W. Rosenstiel, "Automatic Structuring and Optimization of Hierarchical Designs", European Design Automation Conference (EURO-DAC), Sep. 1996, pp. 134-139 https://ieeexplore.ieee.org/document/558195/ https://dl.acm.org/citation.cfm?id=252592.

J. Cong, "Timing Closure Based on Physical Hierarchy", International Symposium on Physical Design (ISPD), Apr. 2002, pp. 170-174, https://dl.acm.org/citation.cfm?id=505429.

C.-C. Chang et al. "Physical Hierarchy Generation with Routing Congestion Control", International Symposium on Physical Design (ISPD), Apr. 2002, pp. 36-41, https://dl.acm.org/citation.cfm?id=505399.

T. Jindal et al., "Detecting tangled logic structures in VLSI netlists", Proceedings of the 47th Design Automation Conference (DAC), Jun. 2010, pp. 603-608, https://dl.acm.org/citation.cfm?id=1837422.

L. Trevillyan et al., "An Integrated Environment for Technology Closure of Deep-Submicron IC Designs", IEEE Design & Test of Computers, v. 21, n. 1, Jan.-Feb. 2004, p. 14-22, https:///ieeexplore.ieee.org/document/1261846/.

* cited by examiner

HIERARCHY-DRIVEN LOGICAL AND PHYSICAL SYNTHESIS CO-OPTIMIZATION

BACKGROUND

The present invention relates to the electronic design automation of integrated circuits (ICs), and more specifically, to logical and physical synthesis of such circuits.

In VLSI (very large scale integration) digital design, a logical netlist is a description of the connectivity of an integrated circuit design that includes a list of terminals ("pins") of the electronic components (e.g., cells, elements, objects, etc.) in the integrated circuit and a list of the electrical conductors that interconnect the terminals (e.g., a net is a conductor that interconnects two or more component terminals). Thus, a netlist includes a network of combinational logic gates and memory elements such as latches/flip-flops. The placement stage determines the locations of all modules in the netlist (modules and their interconnect(s)) generated from logic synthesis. This stage physically realizes the placement of the netlist, by placing all of the cells, terminals, gates, interconnects, etc. within the context of a printed circuit board based on design requirements (e.g., power, timing, etc.). Typically, the primary objective of placement is to optimize wire length, subject to the constraint of no overlap(s) between modules.

By virtue of technology constraints, a nature of a netlist, and/or a design-style, integrated circuit designs typically contain a large cluster or group of elements (logical hierarchies in standard-cells, IP blocks, etc.,) that share a certain characteristic. In contemporary implementations of circuit placements, compact placement of such large clusters during the physical implementation of the logical netlist is under-emphasized or ignored due to the multi-objective (e.g., cell density, congestion, timing, etc.,) nature of circuit placement. In turn, contemporary implementations provide sub-optimal quality of results through inferior clustering itself and inferior handling of such large clusters during placement.

Thus, a netlist may include logical hierarchy structures comprising clusters of elements that share a common characteristic. However, current techniques do not a provide an automatic way to extract hierarchy structures, but rather frequently require a user to explicitly specify hierarchy blocks. Moreover, current techniques ignore hierarchy information during logical optimization and physical optimization (placement). Rather, current techniques synthesize the entire hierarchical netlist as a single flat design.

SUMMARY

Principles of the invention provide techniques which leverage hierarchy information during logical and physical optimization to provide tight coupling and compact placement thus resulting in better integrated circuit design quality.

An aspect of the invention is directed to a method, implemented at least in part on a computer, includes receiving a source file specifying circuit components and electrical connections therebetween. At least a portion of the circuit components and electrical connections are within one or more of a set of logical hierarchical groupings, and a given one of the hierarchical groupings has one or more electrical connections to at least another one of the hierarchical groupings. The method also includes selecting an initial subset of the hierarchical groupings based on one or more characteristics of respective ones of the set of hierarchical groupings and performing individual logical optimization of respective ones of the initial subset of the hierarchical groupings. The logical optimization includes modifying at least one of a circuit component and an electrical connection of at least one of the initial subset of hierarchical groupings. The method further includes determining a revised subset of hierarchical groupings based the one or more characteristics of the respective ones of the set of hierarchical groupings as modified by the logical optimization, and performing global physical optimization of the circuit components and electrical connections based at least in part on the revised subset of hierarchical groupings.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) (e.g., a computer) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

DETAILED DESCRIPTION

One or more embodiments advantageously provide techniques which leverage hierarchy information during logical and physical optimization to provide tight coupling and compact placement thus resulting in better integrated circuit design quality.

Figure 1:
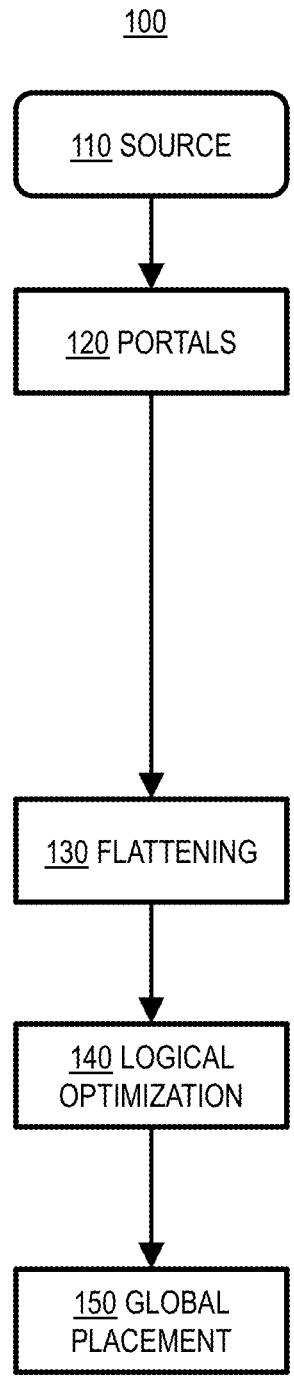
FIG. 1 is a simplified flowchart showing an exemplary technique used in place-driven synthesis (PDS)

FIG. 1 shows an exemplary technique 100 used in place-driven synthesis (PDS). Step 110 involves receiving an integrated circuit design (e.g., netlist) which may be specified in a textual format such as VHDL (Very High Speed Integrated Circuit Hardware Design Language), as defined in IEEE (Institute of Electrical and Electronics Engineers) Standard 1076, and/or Verilog, as defined in IEEE Standard 1364. For example, a hierarchical netlist may be delivered by a fabless designer of an application-specific integrated circuit (ASIC) to a semiconductor fabrication plant. Step 120 applies a portal tool to convert the netlist from a textual format into a data structure suitable for further processing, such as logic optimization. Step 130 involves flattening the entire hierarchical netlist into a single flat design. Step 140 involves logical optimization, and step 150 includes physical optimization such as placement. Step 150 in FIG. 1 may be followed by additional processing steps as discussed below with reference to FIGS. 9 and 10 in order to fabricate an integrated circuit based on design 110. Notably, in technique 100, flattening 130 mangles the name spaces, and makes it difficult for subsequent optimization steps 140 and 150 to reverse-engineer the design hierarchy. Accordingly, technique 100 ignores hierarchy information during logical optimization 140 and physical optimization 150 (placement).

Figure 2:
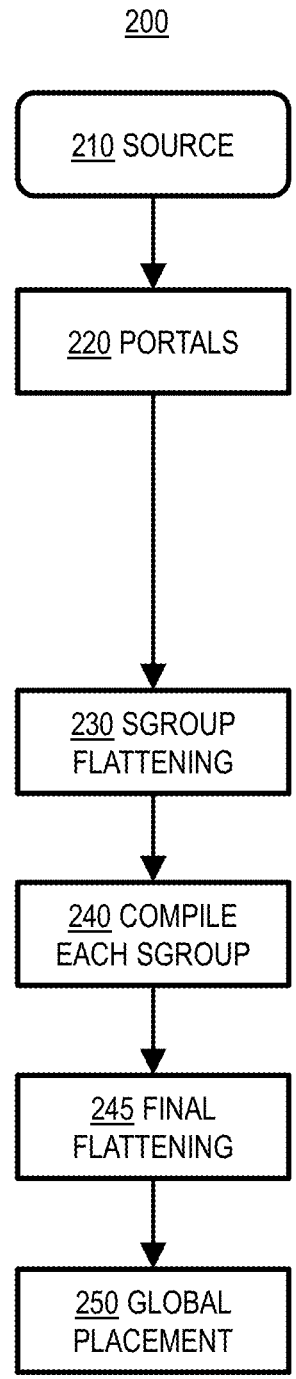
FIG. 2 is a simplified flowchart showing an exemplary technique utilizing synthesis groups (SGROUPs) in place-driven synthesis.

FIG. 2 shows an exemplary technique 200 utilizing synthesis groups (SGROUPs) in place-driven synthesis. Step 210 involves receiving an integrated circuit design (e.g., netlist) which may be specified using VHDL and/or Verilog, as in a manner similar to that discussed above with reference to step 110 in FIG. 1. Step 220 applies a portal tool to the netlist in a manner similar to step 120 in FIG. 1. However, technique 200 uses synthesis groups (SGROUPs) to keep a subset (e.g., an arbitrary number of levels) of the hierarchy in source design 210. Step 230 in FIG. 2 involves flattening each SGROUP individually, rather than flattening the entire design as in step 130 in FIG. 1. Step 240 involves hierarchy-driven logical optimization in which small partitions are synthesized individually: the synthesis "compile" step is run on each hierarchy element (e.g., each individual SGROUP). In some illustrative embodiments, runtime performance may be improved by running logic optimization for each block (e.g., SGROUP) in parallel. Moreover, different logical optimization recipes can be applied to different blocks (e.g., SGROUPs). Step 245 involves flattening the hierarchy elements (e.g., SGROUPs) together before performing physical optimization 250. Step 245 therefore allows for the global placement step 250 to analyze connections external to the SGROUPs as well as internal to the SGROUPs.

Figure 3:
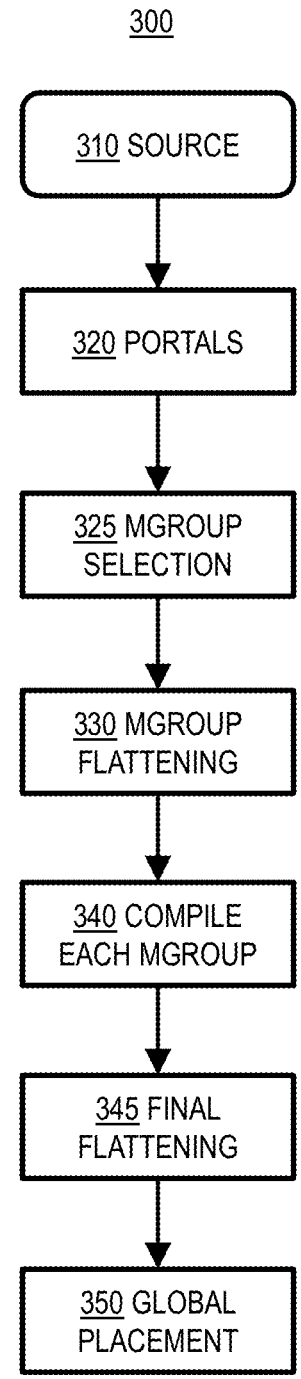
FIG. 3 is a simplified flowchart showing an exemplary technique utilizing mob groups (MGROUPs) in place-driven synthesis.

FIG. 3 shows an exemplary technique 300 utilizing mob groups (MGROUPs) in place-driven synthesis. Step 310 involves a portal receiving an integrated circuit design (e.g., netlist) which may be specified using VHDL and/or Verilog, as in a manner similar to that discussed above with reference to step 110 in FIG. 1. Step 320 applies a portal tool to the netlist in a manner similar to step 120 in FIG. 1. However, step 325 involves selecting a subset (e.g., an arbitrary number of levels) of the hierarchy in source design 310. Step 325 may involve user specification of the hierarchical blocks.

Step 325 may include automatic formation of MGROUPs, for example, by exploring the source design 310 hierarchy and using a quality metric to detect high-quality hierarchical blocks, as further discussed below with reference to FIG. 4A. An exemplary tightness-based quality metric which may be used in embodiments of the present invention may include the ratio of the number of internal nets to the number of external nets (IN/EN). Other exemplary tightness-based quality metrics which may be used in embodiments of the present invention may include Rent's rule metrics and/or empirical physical clustering results, as described in T. Jindal et al., "Detecting tangled logic structures in VLSI netlists", Proceedings of the 47th Design Automation Conference (DAC), June 2010, pp. 603-608, the entirety of which is incorporated by reference herein. Automatic formation of MGROUPs in step 325 may additionally or alternatively include measures to ensure blocks are small enough to be useable during placement, such as size-based filtering and/or hierarchy-level based filtering. For example, MGROUP generation could involve visiting all hierarchy blocks, identifying a subset of the blocks which has a high score on a quality metric (e.g., determining whether the IN/EN ratio exceeds a threshold), then filtering out blocks which are too large. In some embodiments, the MGROUP generation process could select a certain percentage of the hierarchy blocks, for example, the top 10% or 20% as measured by the quality metric. In some embodiments, a quality metric threshold (e.g., minimum IN/EN ratio) could be chosen (e.g., to be 1, 5, 15, etc.) such that a desired percentage (e.g., approximately 10% or 20%) of the blocks will exceed the threshold and therefore be selected as MGROUPs. In such a manner, each block can be easily tagged with a predicted score prior to performing computationally-intensive and time-consuming simulation.

Step 330 in FIG. 3 involves flattening each MGROUP individually in a manner similar to step 230 in FIG. 2, rather than flattening the entire design as in step 130 in FIG. 1. Step 340 involves MGROUP-driven logical optimization in which the synthesis "compile" step is run on each individual MGROUP. In some illustrative embodiments, runtime performance may be improved by running logic optimization for each block (e.g., MGROUP) in parallel. Moreover, different logical optimization recipes can be applied to different blocks (e.g., MGROUPs). Step 345 involves flattening the hierarchy elements (e.g., MGROUPs) together before performing physical optimization 350. Step 345 therefore allows for the global placement step 350 to analyze connections external to the MGROUPs as well as internal to the MGROUPs.

In some embodiments, the system can perform logical and/or physical optimization according to a hierarchal design methodology due to a size and complexity of an integrated circuit. That it, the system execute synthesizes a first block of a first level of the integrated circuit to arrange elements of the first block. Then, the system serially synthesizes each subsequent block of the first level until all of the elements of the first level have been arranged. Next, the system places the synthesized blocks of the first level together and moves to a second level, where the second level is above the first level on the hierarchal design. The system then synthesizes a first block of the second level to arrange elements of this block. Then, the system serially synthesizes each subsequent block of the second level until all of the elements of the first level have been arranged. This synthetization of each level of the hierarchal design is performed until all levels are complete. In some embodiments, optimization of the system according to an illustrative embodiment both optimizes the placement of the elements of the mob along with optimizes the placement of the mobs themselves (e.g., the system performs a two level optimization simultaneously).

Ideally, the aforementioned mob groups (MGROUPs) represent a grouping of a plurality of cell sets in such a way that cells in the same group (e.g., cluster) are more similar (e.g., based on a predetermined characteristic) to each other than to cells in other groups (e.g., subsequent clusters). A mob is a cluster/group of elements or cells that share a certain characteristic. Examples of characteristics shared by a mob include, but are not limited to, closely connected in the netlist, share the same name hierarchy, belong to the same clock domain, part of a cell, now flattened within a cell cluster, and defined by the user to satisfy a particular design constraint.

As further discussed below with reference to FIG. 4B, the MGROUPs may be used to infer mobs during global placement (physical optimization) 350. Thus, the identified blocks and logical optimization results can be used to guide physical optimization. Advantageously, during physical optimization 350, the inferred sub-blocks (e.g., MGROUPs and/or mobs) are placed compactly to keep circuit elements together, wherein the individual elements within a cluster (e.g., mob) are located in physical proximity to each other during multi-objective circuit placement.

In an illustrative embodiment, mob-based global placement in step 350 may incorporate techniques described in U.S. Pat. No. 9,495,501 to Kim et al., the disclosure of which is incorporated by reference herein, in order to place mobs together in the same neighborhood. If desired, different buffering strategies can be applied between intra/inter signals of sub-blocks, and different voltage threshold (Vt) optimization strategies can be applied to different sub-blocks.

Illustrative embodiments incorporating the techniques 200 and/or 300 may advantageously provide significant technical advantages. These advantages include the aforementioned improvement in runtime performance through parallel execution of logical optimization for respective SGROUPs in step 240 and/or MGROUPs in step 340. Illustrative embodiments may also allow different logical and/or physical optimizations to be applied to respective SGROUPs and/or MGROUPs. By considering logical hierarchy information during logical optimization and physical optimization (placement), illustrative embodiments of the present invention can provide a mob-oriented compact placement with an improved quality of results (e.g., timing, congestion, etc.,) while optimizing other placement objectives (e.g., wire length, cell density, etc.). Illustrative embodiments may also provide tight coupling between logical and physical optimizations via MGROUPs and mobs, thus resulting in better integrated circuit design quality, particularly in latch-to-latch (L2L) timing. Illustrative embodiments also provide the ability to capitalize on reuse of design hierarchy blocks in integrated circuit designs. Experimental results have shown that real-world processor designs often have a sufficient number of hierarchy blocks and a sufficient degree of reuse to produce a strong improvement in timing.

Figure 4A:
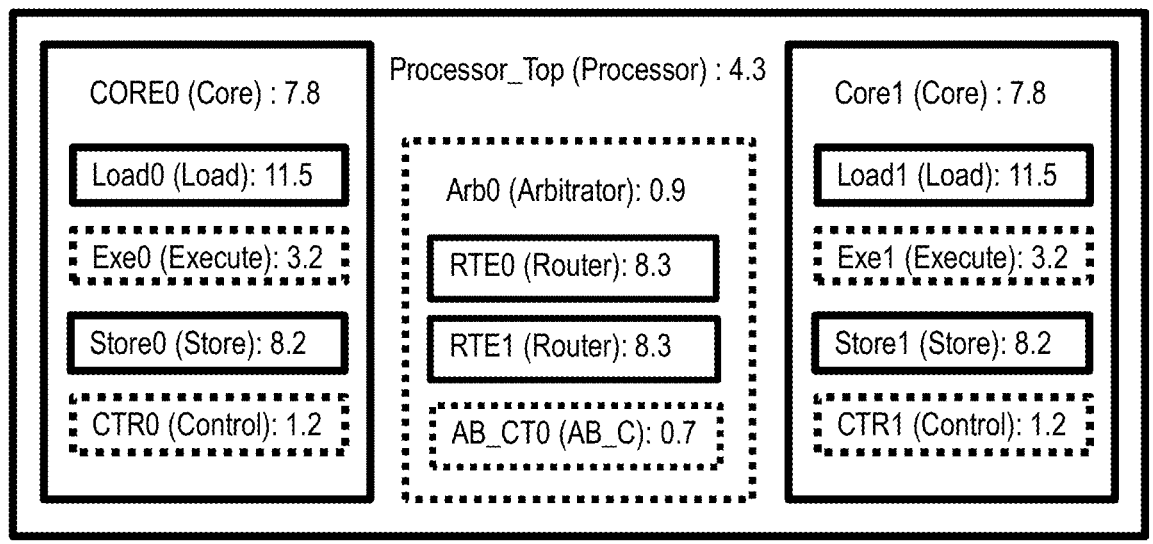
FIG. 4A is a table showing illustrative MGROUPs for an exemplary circuit.
Figure 4B:
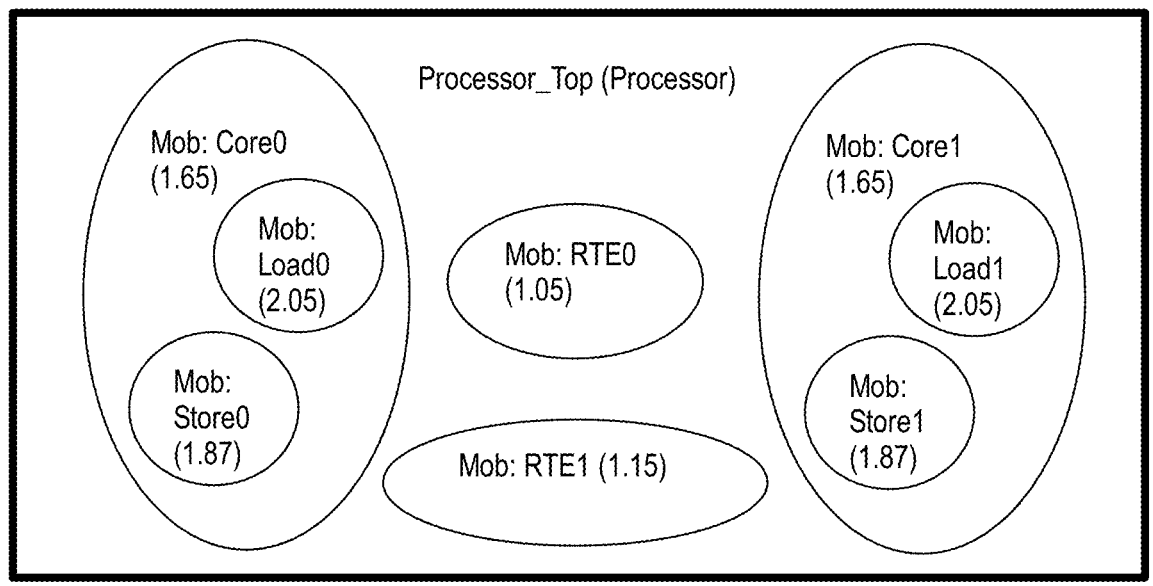
FIG. 4B is a table showing illustrative mobs for an exemplary circuit.

FIGS. 4A and 4B respectively show illustrative MGROUPs and mobs formed from an exemplary processor design called "Processor_Top." In FIG. 4A, for each design hierarchy block, the instance name, block type, and IN/EN ratio is shown. Thus, the top-level design hierarchy block Processor is of type Processor and has an IN/EN ratio of 4.3. Processor_Top includes three first-level design hierarchy blocks: two cores (Core0 and Core1), each having an IN/EN ratio of 7.8, and an arbitrator (Arb0) having an IN/EN ratio of 0.9. The arbitrator first-level design hierarchy block Arb0 includes three second-level design hierarchy blocks: two router blocks RTE0 and RTE1, each having an IN/EN ratio of 8.3, and AB_CT0, which has a IN/EN ratio of 0.7.

The two cores, Core0 and Core1, are of substantially similar, if not completely identical, structure. The two cores themselves each have an IN/EN ratio of 7.8, and each core includes the same number (four) and types of second-level design hierarchy blocks, with blocks of the same type having the same IN/EN ratio. Thus, the cores Core0 and Core1 include respective load blocks Load0 and Load1, each having an IN/EN ratio of 11.5. Thus, the cores Core0 and Core1 include respective load blocks Load0 and Load1, each having an IN/EN ratio of 11.5; respective execute blocks Exe0 and Exe1, each having an IN/EN ratio of 3.2; respective store blocks Store0 and Store1, each having an IN/EN ratio of 8.2; and respective control blocks CTR0 and CTR1, each having an IN/EN ratio of 1.2.

As previously discussed, only a subset of the design hierarchy blocks shown in FIG. 4A are selected as MGROUPs. In FIG. 4A, the design blocks which are selected as MGROUPs are shown with solid borders, while those which are not selected as MGROUPs are shown with dotted borders. In the illustrative embodiment shown in FIG. 4A, a respective MGROUP is generated (e.g., step 325 in FIG. 3) from each first-level and second-level design hierarchy block which has an IN/EN ratio greater than 5 (i.e., a ratio cut of 5).

The two core first-level design blocks Core0 and Core1, with IN/EN ratios of 7.8, are selected as MGROUPs, while arbitrator first-level design block Arb0, with an IN/EN ratio of 0.9, is not. However, even though Arb0 is not selected as an MGROUP because its IN/EN ratio is only 0.9, two of its constituent second-level design blocks, namely router blocks RTE0 and RTE1, are selected as MGROUPs because they each have an IN/EN ratio of 8.3. Within each of two cores, the load and store second-level design blocks are selected as MGROUPs, but the execute and control second-level design blocks are not selected as MGROUPs.

FIG. 4A includes a total of 14 hierarchy design blocks: 3 first-level design blocks and 11 second-level design blocks. However, only 8 of these 14 hierarchy design blocks (e.g., the ones with an IN/EN ratio greater than 5) are selected as MGROUPs: Core0, Load0, Store0, RTE0, RTE1, Core1, Load1, Store1. As previously discussed with reference to FIG. 3, each of these MGROUPs is individually flattened (step 330), individually compiled (step 340), and then flattened together (step 345).

As shown in FIG. 4B, each of the 8 MGROUPs shown in FIG. 4A becomes a corresponding mob. The MGROUPs in FIG. 4A are formed in step 325 for use during logic optimization step 340, while the mobs in FIG. 4B are formed in step 345 for use during physical optimization step 350. It should be noted that the IN/EN values shown for the mobs in FIG. 4B differ from the corresponding numeric values shown for MGROUPs in FIG. 4A due to changes made to the netlist (e.g., buffering) during the individual logic optimization of each MGROUP in step 340. For example, a large gate may be divided into a set of smaller gates, thereby resulting in the numerous new gates being added to the netlist during logical optimization. Thus, logic optimization step 330 may result in a decrease of the IN/EN ratio threshold which would indicate a high-quality (e.g., tight) grouping from 5 for the MGROUPs in FIG. 4A to 1 for the mobs in FIG. 4B: every mob shown in FIG. 4B has an IN/EN ratio greater than 1 yet none has an IN/EN ratio greater than 5 as shown in FIG. 4A.

It should also be noted that since the logical optimization is executed for each individual mob, MGROUPs which had the same IN/EN ratio in FIG. 4A may produce mobs with differing IN/EN ratios in FIG. 4B. Thus, the cores Core0 and Core1 each had an IN/EN ratio of 7.8 in FIG. 4A, but in FIG. 4B, Core0 has an IN/EN ratio of 1.65 and Core1 has an IN/EN ratio of 1.75. Within the cores, load blocks Load0 and Load1 each had an IN/EN ratio of 11.5 in FIG. 4A, but in FIG. 4B, Load0 has an IN/EN ratio of 2.05 and Load1 has an IN/EN ratio of 2.15. Also within the cores, store blocks Store0 and Store1 each had an IN/EN ratio of 8.2, but in FIG. 4B, Store0 has an IN/EN ratio of 1.87 and Store1 has an IN/EN ratio of 1.82.

One of the goals of physical optimization (e.g., routing) is to minimize wire length by placing closely-associated components (e.g., blocks having more internal connections than external connections such that the IN/EN ratio>1) in physical proximity (preferably contiguity). Thus, in FIG. 4B, objects within a given mob formed from a respective MGROUP (Core0, Load0, Store0, RTE1, Core1, Load1, Store1) are placed together within a region, represented by a shape. Moreover, second-level mobs Load0 and Store0 are placed within respective regions of first-level mob Core0, while second-level mobs Load1 and Store1 are placed within respective regions of first-level mob Core1. Objects from the design blocks which were not selected as mobs, e.g., Exe0, CTR0, AB_CT0, Exe1, and CTR1 are placed arbitrarily (probably evenly) within the remaining area of Processor_Top which is outside the mobs. It should be noted that the specific shapes shown in FIG. 4B are strictly illustrative (e.g., the placements need not be regular geometric figures, such as ellipses or polygons) and are not to scale.

Figure 5A:
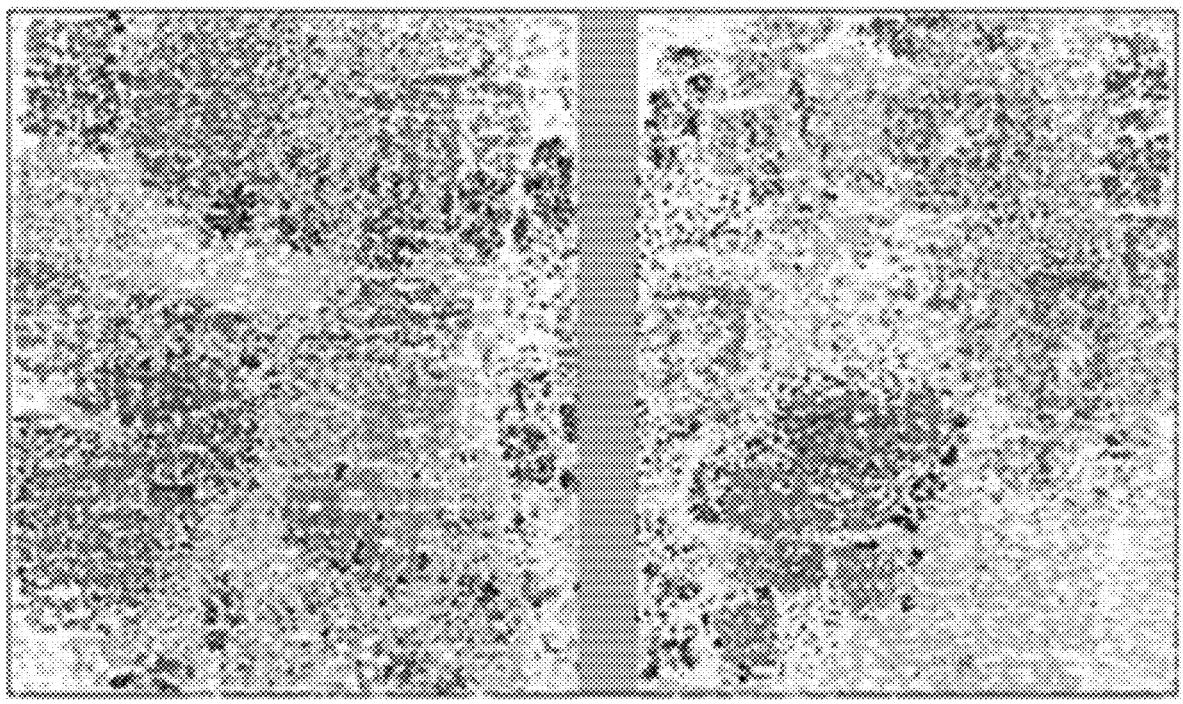
FIG. 5A shows an illustrative global placement for an exemplary circuit using name-based clustering.
Figure 5B:
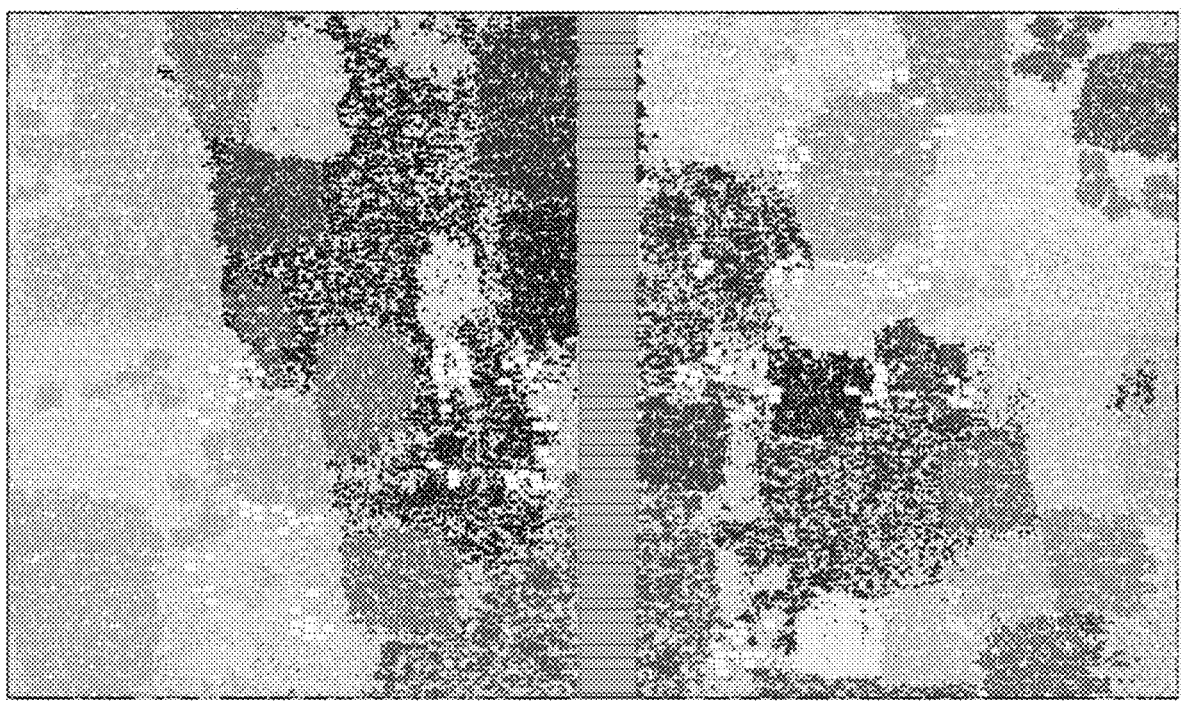
FIG. 5B shows an illustrative global placement for an exemplary circuit using automatic SGROUP synthesis.
Figure 5C:
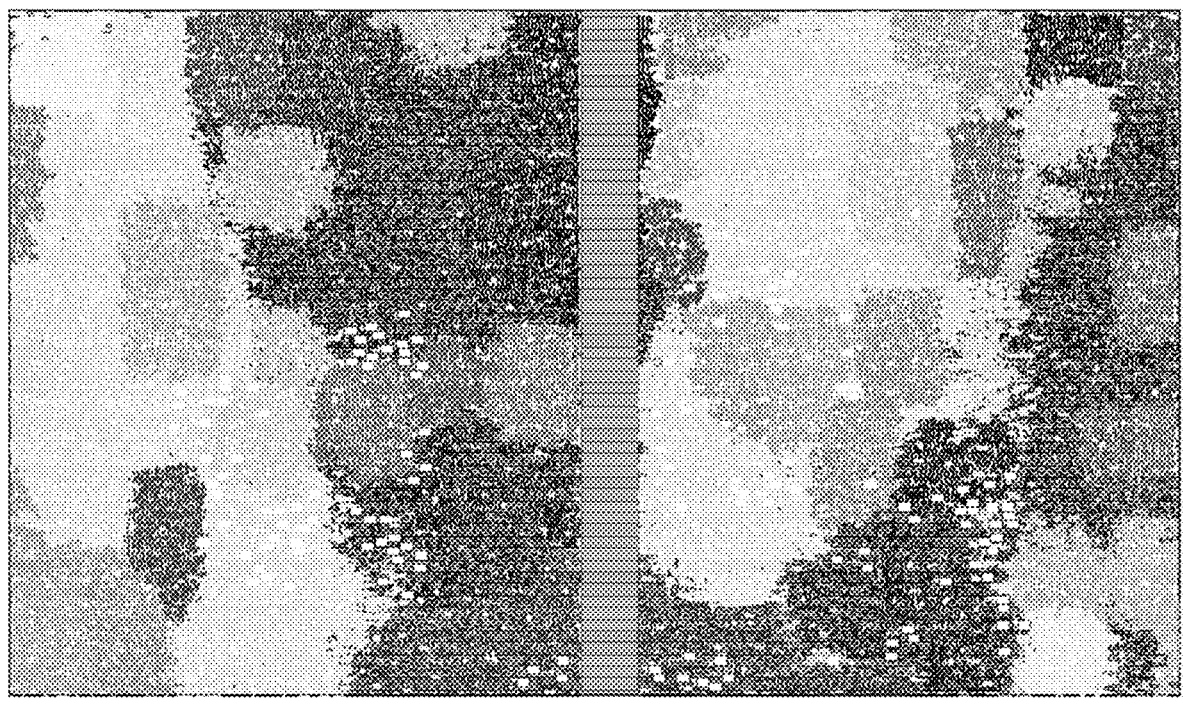
FIG. 5C shows an illustrative global placement for an exemplary circuit using automatic MGROUP synthesis.

FIGS. 5A-5C show experimental results of global placement on an exemplary circuit using different clustering techniques. It should be noted that the circuit used to generate the results shown in FIGS. 5A-5C is not the same circuit used to generate the results shown in FIGS. 4A and 4B. In FIGS. 5A-5C, a block of components with an IN/EN ratio greater than 1 (i.e., more internal connections than external connections) is designated using a respective shade, with all components within that block shown in the same shade. FIG. 5A shows the results of global placement using name-based clustering, in which clusters (e.g., blocks shown in FIG. 5A with a given shade) are formed simply by grouping together networks with similar names, as described in, e.g., Y.-L. Chuang et al., "Design-hierarchy aware mixed-size placement for routability optimization", 2010 IEEE/ACM International Conference on Computer-Aided Design (ICCAD), November 2010, pp. 663-668. However, in FIG. 5A, components having a given shade (e.g., within the same block) are often widely scattered, which can result in undesirably large interconnect distances.

FIG. 5B shows the results of global placement using automatic SGROUP synthesis as discussed above with reference to FIG. 2, in which a block of components shown in FIG. 5B with a given shade may comprise a respective SGROUP. FIG. 5C shows the results of global placement using automatic MGROUP synthesis as discussed above with reference to FIG. 3, in which a block of components shown in FIG. 5B with a given shade may comprise a respective MGROUP and/or mob. Within FIGS. 5B and 5C, the white boxes within the colored blocks represent objects which were added to the netlist during logical optimization as discussed above with reference to FIGS. 4A and 4B. In contrast to FIG. 5A, components having a given shade (e.g., within the same block) are grouped more tightly (e.g., in greater physical proximity) in FIG. 5B, and are grouped even more tightly (e.g., largely within a single contiguous cluster in many instances) in FIG. 5C, thereby advantageously reducing interconnect distances and thus improving timing performance metrics.

Figure 6A:
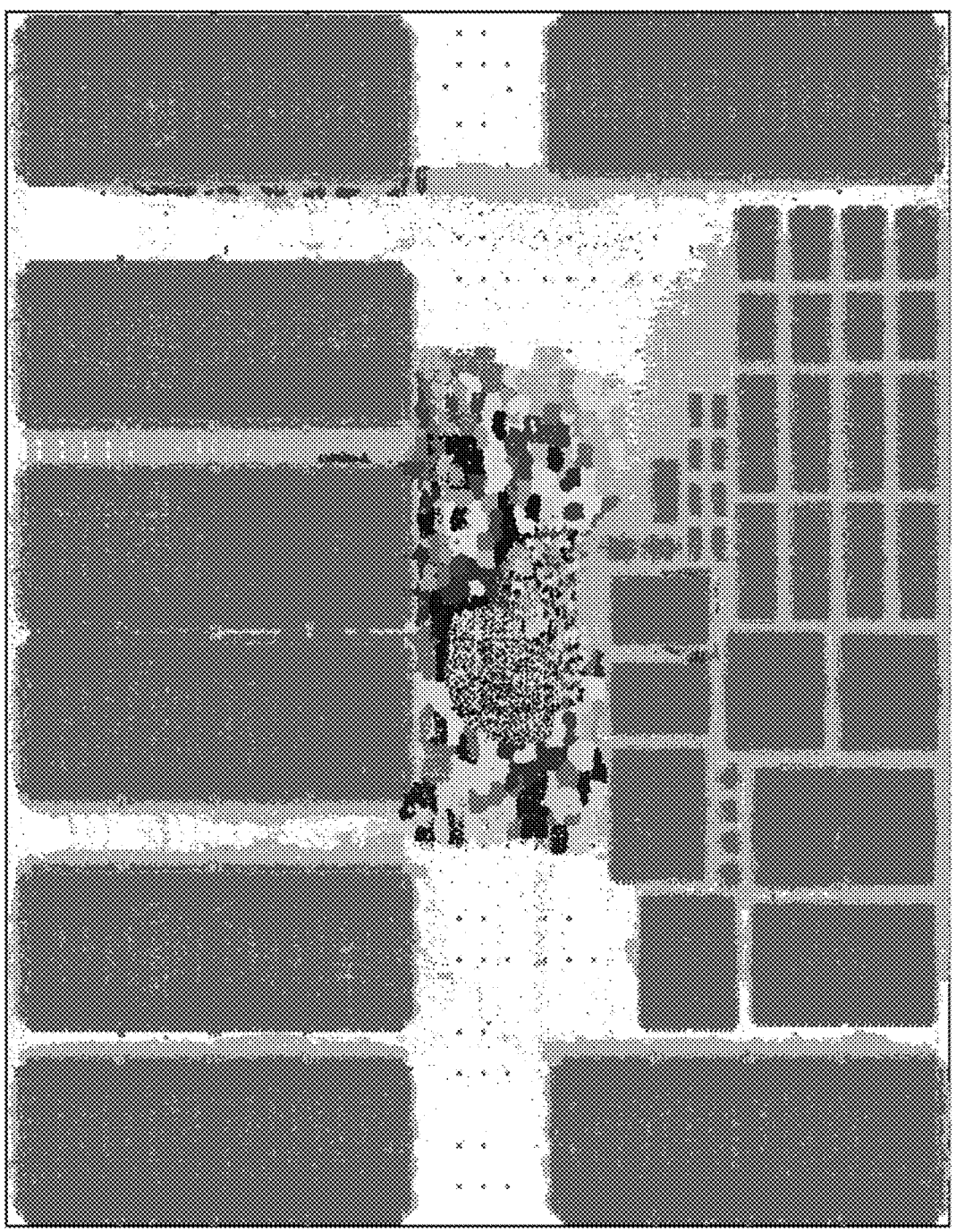
FIG. 6A shows an illustrative global placement for an exemplary circuit using conventional techniques.
Figure 6B:
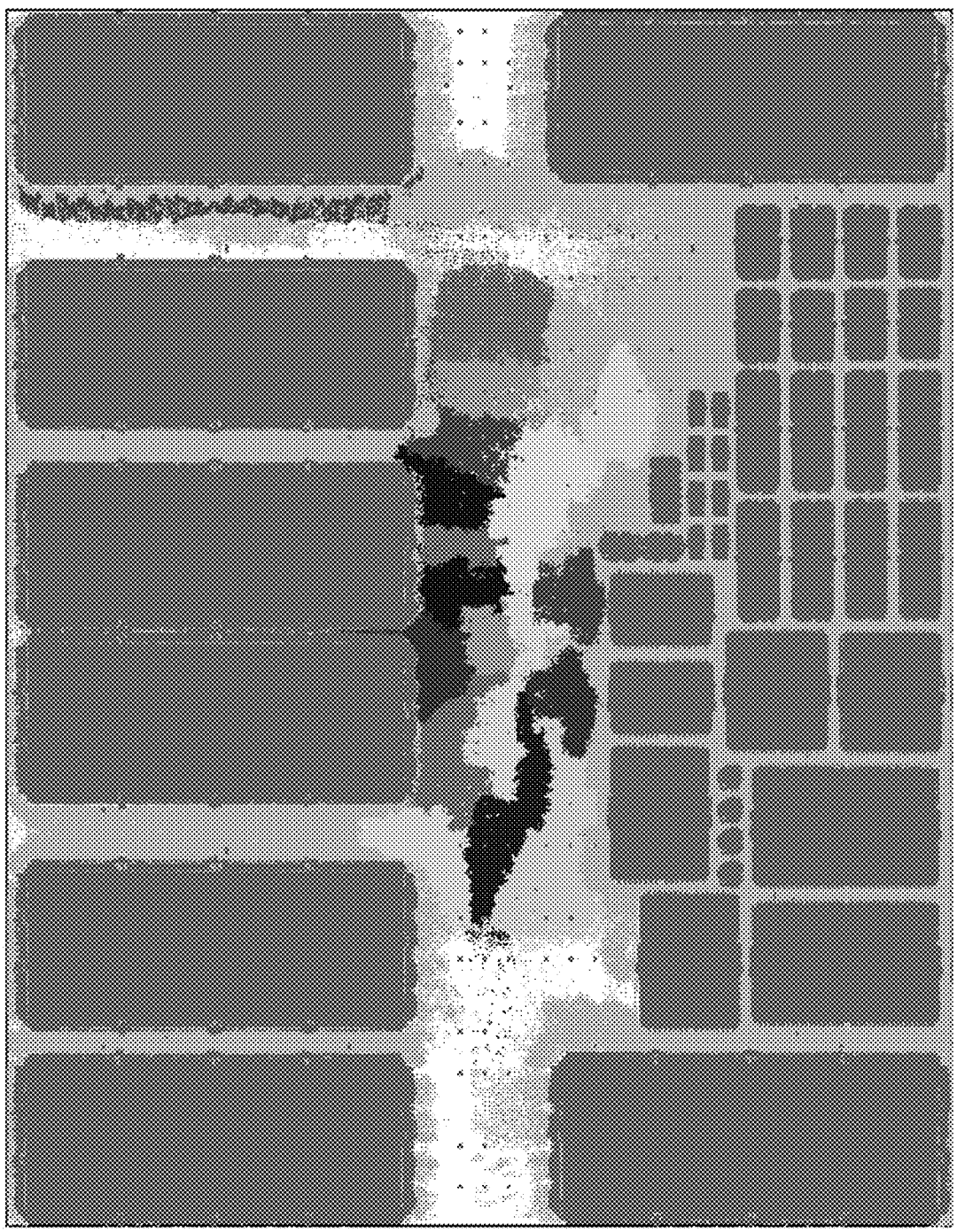
FIG. 6B shows an illustrative global placement for an exemplary circuit using inventive techniques.

FIGS. 6A and 6B show experimental results of global placement on another exemplary circuit using different clustering techniques. It should be noted that the circuit used to generate the results shown in FIGS. 6A and 6B is neither the circuit used to generate the results shown in FIGS. 5A-5C nor the circuit used to generate the results shown in FIGS. 4A and 4B. In FIGS. 6A and 6B, a block of components with an IN/EN ratio greater than 1 (i.e., more internal connections than external connections) is designated using a respective shade, with all components within that block shown in the same shade.

FIG. 6A shows an illustrative global placement for an exemplary circuit using techniques discussed above with reference to FIGS. 1 and 5A, e.g., user-specified and/or name-based clustering, in which a block of components shown in FIG. 6A with a given shade is manually specified by a user and/or formed simply by grouping together networks with similar names. FIG. 6B shows an illustrative global placement for an exemplary circuit using inventive techniques discussed above with reference to FIGS. 2 and 3, as well as FIGS. 5B and 5C, e.g., automatic synthesis, in which a block of components shown in FIG. 6B with a given shade may comprise a respective SGROUP, MGROUP, and/or mob.

In FIG. 6A, components having a given shade (e.g., within the same block) are rather widely scattered, which can result in undesirably large interconnect distances. In contrast to the clustering techniques used in FIG. 6A, techniques according to embodiments of the present invention cause components having a given shade (e.g., within the same block) to be grouped more tightly (e.g., in greater physical proximity and often largely within a single contiguous cluster) in FIG. 6B, thereby advantageously reducing interconnect distances and thus improving timing performance metrics.

Figure 7:
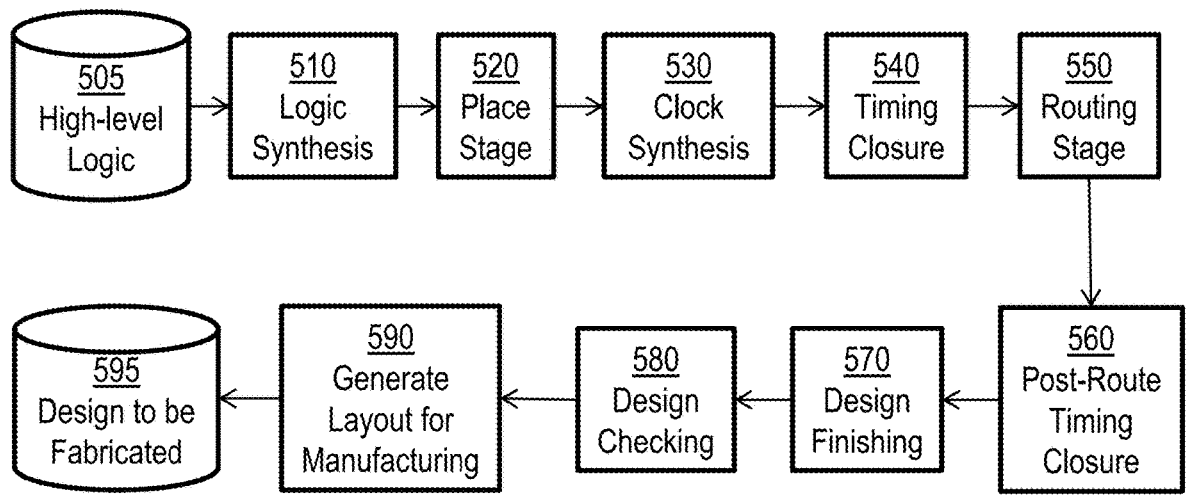
FIG. 7 shows an exemplary high-level electronic design automation (EDA) tool flow, within which aspects of the invention can be employed.

FIG. 7 depicts an example high-level Electronic Design Automation (EDA) tool flow, which is responsible for creating an optimized microprocessor (or other IC) design to be manufactured. A designer could start with a high-level logic description 505 of the circuit (e.g. VHDL or Verilog). The logic synthesis tool 510 compiles the logic, and optimizes it without any sense of its physical representation, and with estimated timing information. The placement tool 520 takes the logical description and places each component, looking to minimize congestion in each area of the design. The clock synthesis tool 530 optimizes the clock tree network by cloning/balancing/buffering the latches or registers. The timing closure step 540 performs a number of optimizations on the design, including buffering, wire tuning, and circuit repowering; its goal is to produce a design which is routable, without timing violations, and without excess power consumption. The routing stage 550 takes the placed/optimized design, and determines how to create wires to connect all of the components, without causing manufacturing violations. Post-route timing closure 560 performs another set of optimizations to resolve any violations that are remaining after the routing. Design finishing 570 then adds extra metal shapes to the netlist, to conform with manufacturing requirements. The checking steps 580 analyze whether the design is violating any requirements such as manufacturing, timing, power, electromigration or noise. When the design is clean, the final step 590 is to generate a layout for the design, representing all the shapes to be fabricated in the design to be fabricated. In one or more embodiments, the layout is instantiated as a design structure 595.

In one or more embodiments, a further step includes fabricating a physical integrated circuit in accordance with the analytical placement. One non-limiting specific example of accomplishing this is described herein in connection with FIGS. 7, 9 and 10. For example, a design structure, based on the analytical placement, is provided to fabrication equipment to facilitate fabrication of a physical integrated circuit in accordance with the design structure. In one or more embodiments, a physical integrated circuit is fabricated in accordance with the design structure.

Figure 8:
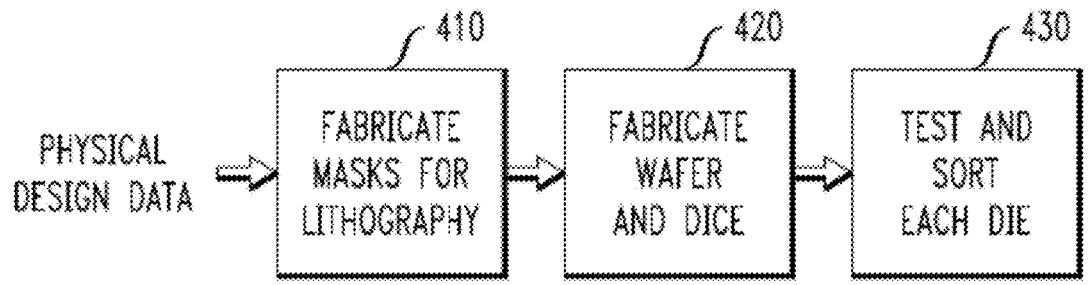
FIG. 8 shows further aspects of IC fabrication from physical design data.

Once the physical design data is obtained, based, in part, on the placement processes described herein, an integrated circuit designed in accordance therewith can be fabricated according to known processes that are generally described with reference to FIG. 8. Generally, a wafer with multiple copies of the final design is fabricated and cut (i.e., diced) such that each die is one copy of the integrated circuit. At block 410, the processes include fabricating masks for lithography based on the finalized physical layout. At block 420, fabricating the wafer includes using the masks to perform photolithography and etching. Once the wafer is diced, testing and sorting each die is performed at 430 to filter out any faulty die.

Figure 10:
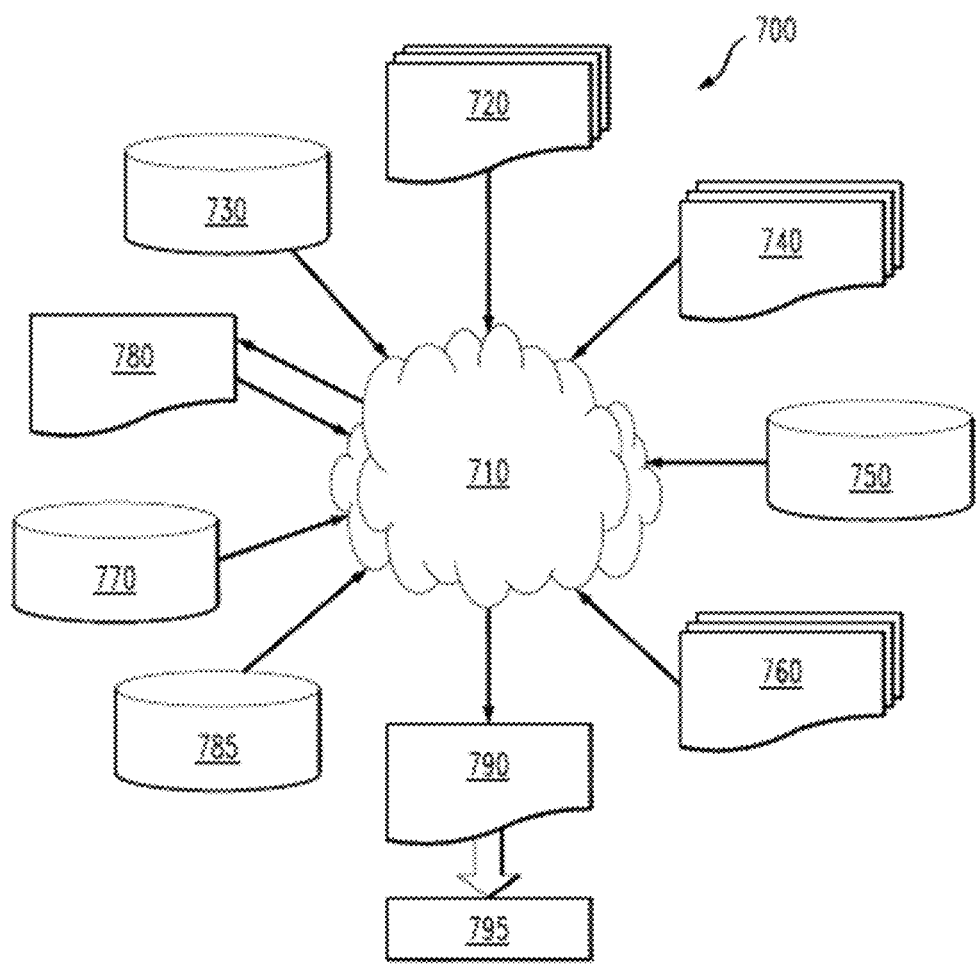
FIG. 10 is a flow diagram of a design process used in semiconductor design, manufacture, and/or test.

Furthermore, referring to FIG. 10, in one or more embodiments the at least one processor is operative to generate a design structure for the integrated circuit design in accordance with the placement analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved compared to circuits designed using prior art techniques: for example, illustrative embodiments provide tight coupling between logical and physical optimizations via MGROUPs and mobs, thus resulting in better integrated circuit design quality, particularly in latch-to-latch (L2L) timing. Thus, by considering logical hierarchy information during logical optimization and physical optimization (placement), illustrative embodiments of the present invention can provide a compact placement with an improved quality of results (e.g., timing, congestion, etc.), while optimizing other placement objectives (e.g., wire length, cell density, etc.)

Exemplary System

One or more embodiments of the invention, or elements thereof, can be implemented in the form of an apparatus including a memory and at least one processor that is coupled to the memory and operative to perform exemplary method steps. One or more embodiments include a computer (e.g., shown in FIG. 9) including a memory 604; and at least one processor 602, coupled to the memory, and operative to carry out or otherwise facilitate any one, some, or all of the method steps described herein. In one or more embodiments, integrated circuits formed according to inventive techniques provide tight coupling between logical and physical optimizations via MGROUPs and mobs, thus resulting in better integrated circuit design quality, particularly in latch-to-latch (L2L) timing, which in turn will enhance runtime performance (speed) of a computer using said improved integrated circuit. The runtime performance (speed) of a computer performing integrated circuit design optimization according to an embodiment of the present invention may also improve through parallel execution of logical optimization for respective MGROUPs, as well as the use of individualized settings for each MGROUP during logical and/or physical optimization.

Figure 9:
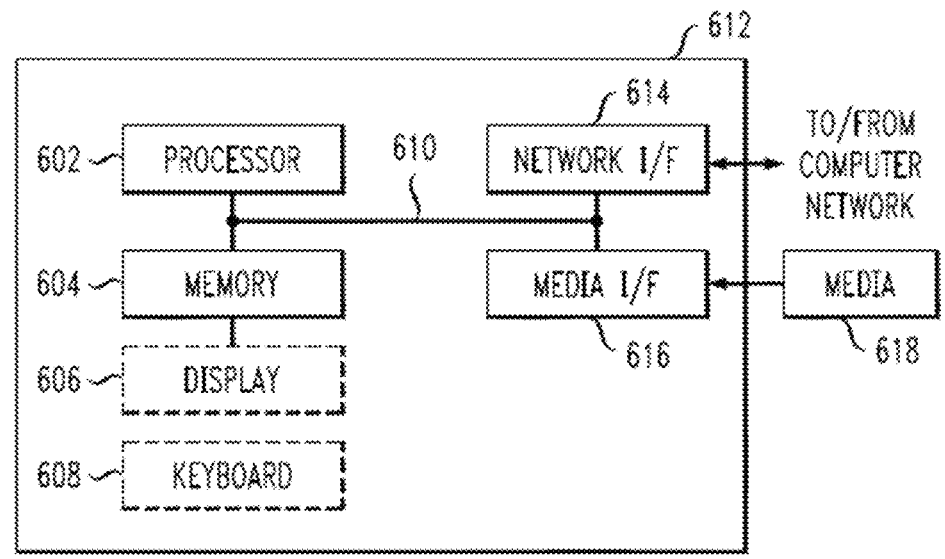
FIG. 9 depicts a computer system that may be useful in implementing one or more aspects and/or elements of the invention.

One or more embodiments can make use of software running on a general purpose computer or workstation. With reference to FIG. 9, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 9) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules/ routines and/or sub-modules/subroutines of the system, as described above, executing on one or more hardware processors 602. Further, a computer program product as described below can include code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICs), functional circuitry, one or more appropriately programmed general purpose digital computers with associated memory, and the like. Given the teachings of the invention provided herein, one of ordinary skill in the related art will be able to contemplate other implementations of the components of the invention.

Computer Program Products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the analysis techniques herein with semiconductor integrated circuit design simulation, test, layout, and/or manufacture. In this regard, FIG. 10 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using timing analysis or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc. Improved placement can be performed as described herein.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of improving the performance of a computer performing electronic design analysis, comprising:
receiving a source file specifying circuit components and electrical connections therebetween, wherein at least a portion of the circuit components and electrical connections are within one or more of each of a set of logical hierarchical groupings, and wherein a given one of the hierarchical groupings has one or more electrical connections to at least another one of the hierarchical groupings;
selecting an initial subset of the hierarchical groupings based on one or more characteristics of respective ones of the set of hierarchical groupings, the one or more characteristics comprising a coupling tightness metric, the coupling tightness metric indicating a degree of coupling between two or more of the circuit components;
performing individual logical optimization of respective ones of the initial subset of the hierarchical groupings, said logical optimization comprising modifying at least one of a circuit component and an electrical connection of at least one of the initial subset of hierarchical groupings;
determining a revised subset of hierarchical groupings based the one or more characteristics of the respective ones of the set of hierarchical groupings as modified by the logical optimization; and
performing global physical optimization of the circuit components and electrical connections based at least in part on the revised subset of hierarchical groupings.

2. The method of claim 1, wherein the modifying comprises adding at least another circuit component to a given one of the selected subset of hierarchical groupings.

3. The method of claim 2, wherein the modifying further comprises removing the at least another circuit component from another one of the set of hierarchical groupings when adding the at least another circuit component to the given one of the selected subset of hierarchical groupings.

4. The method of claim 2, wherein the adding further comprises splitting at least a given circuit component within the given one of the selected subset of hierarchical groupings to form a plurality of circuit components comprising the at least another circuit component within the given one of the hierarchical groupings.

5. The method of claim 1, further comprising performing global flattening of the circuit components and electrical connections only after performing the individual logical optimization.

6. The method of claim 5, further comprising performing individual flattening of respective ones of the initial subset of the hierarchical groupings before performing the logical optimization.

7. The method of claim 5, further comprising performing the global flattening before performing the physical optimization.

8. The method of claim 1, wherein the one or more characteristics comprises at least one name assigned to one or more of the circuit elements within at least a given one of the set of hierarchical groupings.

9. The method of claim 1, wherein the initial subset is selected automatically by the computer rather than specified by a human user.

10. The method of claim 1, wherein the individual logical optimization of respective ones of the initial subset of the hierarchical groupings is performed at least one of in parallel and substantially simultaneously.

11. The method of claim 1, wherein the individual logical optimization of respective ones of the initial subset of the hierarchical groupings comprises applying a different optimization strategy to at least a first one of the initial subset than to at least a second one of the initial subset.

12. The method of claim 11, wherein the different optimization strategy comprises at least one of a different buffering strategy and a different threshold voltage optimization strategy.

13. A method of improving the performance of a computer performing electronic design analysis, comprising:
  receiving a source file specifying circuit components and electrical connections therebetween, wherein at least a portion of the circuit components and electrical connections are within one or more of each of a set of logical hierarchical groupings, and wherein a given one of the hierarchical groupings has one or more electrical connections to at least another one of the hierarchical groupings;
  selecting an initial subset of the hierarchical groupings based on one or more characteristics of respective ones of the set of hierarchical groupings;
  performing individual logical optimization of respective ones of the initial subset of the hierarchical groupings, said logical optimization comprising modifying at least one of a circuit component and an electrical connection of at least one of the initial subset of hierarchical groupings;
  determining a revised subset of hierarchical groupings based the one or more characteristics of the respective ones of the set of hierarchical groupings as modified by the logical optimization; and
  performing global physical optimization of the circuit components and electrical connections based at least in part on the revised subset of hierarchical groupings, wherein the one or more characteristics comprises a coupling tightness metric, wherein selecting the initial subset of hierarchical groupings comprises:
    calculating the coupling tightness metric for respective ones of the set of hierarchical groupings; and
    when the coupling tightness metric for a given one of the set of hierarchical groupings exceeds a first threshold, incorporating the given one of the set within the initial subset of hierarchical groupings.

14. The method of claim 13, wherein the coupling tightness metric comprises a ratio between electrical connections within the given one of the set and electrical connections between the given one of the set and at least another one of the set.

15. The method of claim 13, wherein selecting the initial subset further comprises filtering the given one of the set from the initial subset of hierarchical groupings based on at least one of a size and a level of the given one of the set.

16. The method of claim 13, wherein determining the revised subset of hierarchical groupings comprises:
  calculating the coupling tightness metric for the respective ones of the set of hierarchical groupings as modified by the logical optimization; and
  when the coupling tightness metric for the given one of the set of hierarchical groupings exceeds a second threshold, incorporating the given one of the set within the revised subset of hierarchical groupings.

17. The method of claim 16, wherein the coupling tightness metric comprises a ratio between electrical connections within the given one of the set and electrical connections between the given one of the set and at least another one of the set, and wherein the second threshold is approximately equal to one.

18. The method of claim 16, wherein the second threshold is lower than the first threshold.

19. A non-transitory computer readable medium comprising computer executable instructions which when executed by a computer performing electronic design analysis cause the computer to perform a method which improves the performance of the computer, the method comprising:
  receiving a source file specifying circuit components and electrical connections therebetween, wherein at least a portion of the circuit components and electrical connections are within one or more of each of a set of logical hierarchical groupings, and wherein a given one of the hierarchical groupings has one or more electrical connections to at least another one of the hierarchical groupings;
  selecting an initial subset of the hierarchical groupings based on one or more characteristics of respective ones of the set of hierarchical groupings, the one or more characteristics comprising a coupling tightness metric, the coupling tightness metric indicating a degree of coupling between two or more of the circuit components;
  performing individual logical optimization of respective ones of the initial subset of the hierarchical groupings, said logical optimization comprising modifying at least one of a circuit component and an electrical connection of at least one of the initial subset of hierarchical groupings;
  determining a revised subset of hierarchical groupings based the one or more characteristics of the respective ones of the set of hierarchical groupings as modified by the logical optimization; and
  performing global physical optimization of the circuit components and electrical connections based at least in part on the revised subset of hierarchical groupings.

20. A computer comprising:
  a memory; and
  at least one processor, coupled to said memory, and operative to:
    receive a source file specifying circuit components and electrical connections therebetween, wherein at least a portion of the circuit components and electrical connections are within one or more of each of a set of logical hierarchical groupings, and wherein a given one of the hierarchical groupings has one or more electrical connections to at least another one of the hierarchical groupings;
    select an initial subset of the hierarchical groupings based on one or more characteristics of respective ones of the set of hierarchical groupings, the one or more characteristics comprising a coupling tightness metric, the coupling tightness metric indicating a degree of coupling between two or more of the circuit components;
    perform individual logical optimization of respective ones of the initial subset of the hierarchical groupings, said logical optimization comprising modifying at least one of a circuit component and an electrical connection of at least one of the initial subset of hierarchical groupings;

determine a revised subset of hierarchical groupings based the one or more characteristics of the respective ones of the set of hierarchical groupings as modified by the logical optimization; and perform global physical optimization of the circuit components and electrical connections based at least in part on the revised subset of hierarchical groupings.

\* \* \* \* \*